United States Patent [19]

GRIFFEN

[11] 4,380,175
[45] Apr. 19, 1983

[54] COMPENSATED LOAD CELL

[75] Inventor: Neil C. Griffen, Columbus, Ohio

[73] Assignee: Reliance Electric Company, Cleveland, Ohio

[21] Appl. No.: 272,928

[22] Filed: Jun. 12, 1981

[51] Int. Cl.³ .......................... G01L 1/22; G01L 25/00
[52] U.S. Cl. ................................. 73/862.67; 73/1 B; 73/765; 177/211
[58] Field of Search ............ 73/1 B, 765, 767, 862.65, 73/862.66, 862.67; 177/211

[56] References Cited

U.S. PATENT DOCUMENTS

| | | | |
|---|---|---|---|
| 3,576,128 | 4/1971 | Lockery | 73/765 X |
| 3,968,683 | 7/1976 | Drmond | 73/862.67 |
| 4,128,001 | 12/1978 | Marks | 73/1 B |
| 4,342,217 | 8/1982 | Paetow | 73/1 B |

FOREIGN PATENT DOCUMENTS 55-72836  6/1980  Japan ................ 73/862.65

*Primary Examiner*—Charles A. Ruehl
*Attorney, Agent, or Firm*—Roy F. Hollander; William F. Simpson

[57] ABSTRACT

A force measuring device comprising a load receiving platform supported by a multiple bending parallelogram beam type load cell is provided with a plurality of electrical strain gages. Strain gage elements mounted on one of the beams are displaced toward one side of the beam and strain gage elements mounted on the other beam are displaced toward the other side of the other beam. An appropriate resistor network is connected to at least one strain gage on one or both of the beams to correct for either longitudinal or transverse displacement of the load on the platform. To correct for both transverse and longitudinal displacement of the load a resistor network is connected to each of three of the strain gages. Suitable procedures for determining the values of the resistor networks in combination with the above structure are included.

7 Claims, 6 Drawing Figures

COMPENSATED LOAD CELL

BACKGROUND OF THE INVENTION

The present invention relates to improved load cells for precision measurements of weights and forces. U.S. Pat. No. 3,576,128 granted Apr. 27, 1971 to Lockery discloses a load cell comprising two generally parallel beam members forming a parallelogram with a longitudinal axis parallel to the beams. The beam members are rigidly connected together at one end and attached to a support. The other ends are rigidly connected together and support a scale pan or platform. A pair of strain gages is attached to each of the beam members. In accordance with the above patent, a shunt resistor is connected across the strain gages at one end or the other of the load cell so that accurate force measurements independent of the load position along the longitudinal axis of the parallelogram may be obtained. Such resistors do not, however, make the output of the load cell independent of the position of the load along axes transverse to the longitudinal axis. Instead, they frequently increase the variation of the output with position of the load along such axes.

SUMMARY

According to an aspect of this invention, this disadvantage is overcome and the output of the load cell made substantially independent of the position of the load along axes transverse to the longitudinal axis of the load cell.

In accordance with this invention the strain gages are displaced from the center toward one edge of one of the beams and toward the opposite edge of the other beam. A compensating resistance value is then determined and an appropriate resistor network is connected to the strain gages on one or the other of the beams to compensate for transverse displacement of the load. In addition, by connecting an appropriate resistor network to three of the four strain gages the output of the load cell, with the gages displaced as above, is substantially independent of the position of the load on the platform. A number of ways are disclosed to determine the values of the resistor networks.

DESCRIPTION

Figures 1, 3:
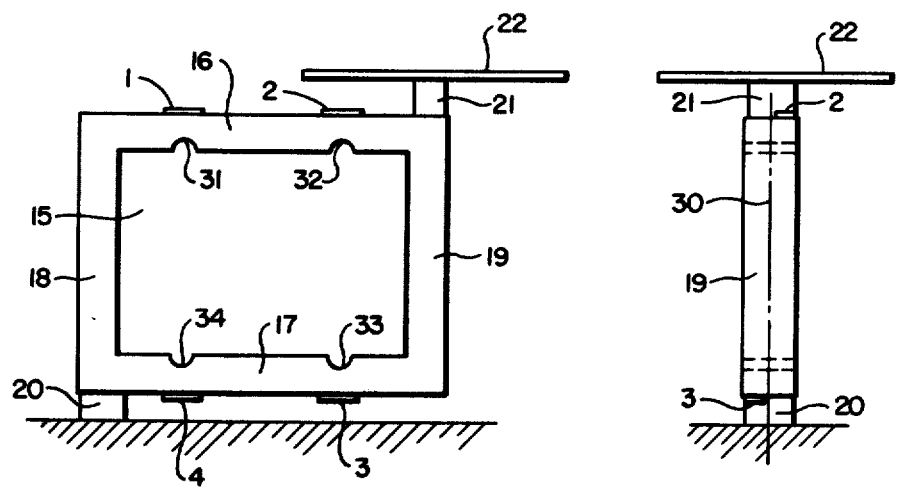
FIG. 1 is a side view of a scale including an embodiment of a load cell in accordance with this invention.
FIG. 3 is an end view of the scale.
Figures 2, 4:
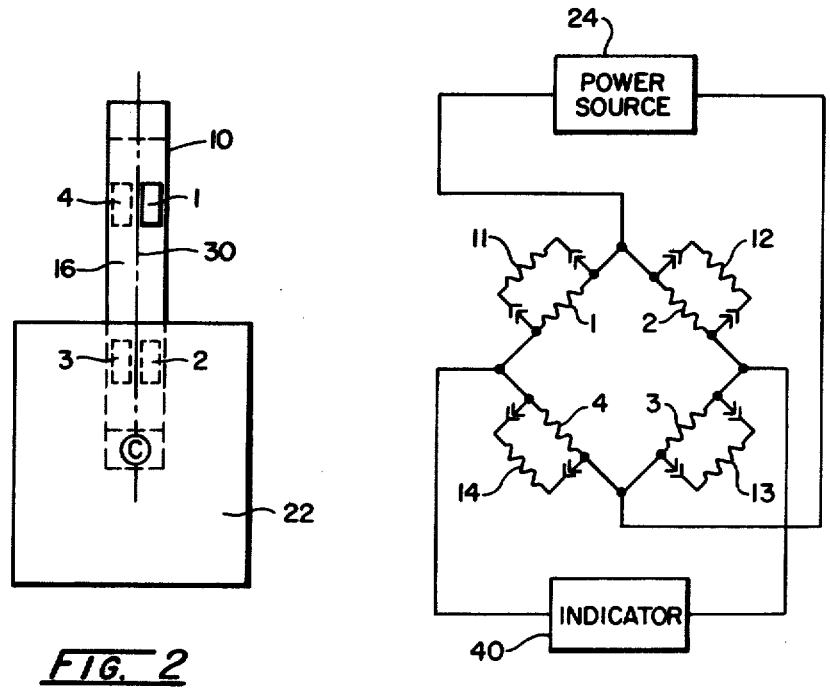
FIG. 2 is a top view of the scale.
FIG. 4 is a schematic diagram of a bridge circuit including the strain gages of the load cell of FIGS. 1 to 3 and illustrating how compensating resistors may be connected thereto.

Referring initially to FIGS. 1 to 3, the force responsive member 15 is in the form of a rectangle having an upper beam member 16 and a lower beam member 17. The left hand ends (as viewed in FIG. 1) of these beams are connected by vertical member 18 and the right hand ends by vertical member 19. Members 18 and 19 are preferably integral with beam members 16 and 17 but if they are not so formed they are rigidly interconnected with members 16 and 17 to form the load responsive structure 15.

Structure 15 is supported by a support 20 and in turn supports a load receiving platform 22 through member 21. As shown, member 21 rests on the top surface of beam 16. However, if desired it may be supported by vertical member 19. Likewise, support 20 is shown on the lower surface of the beam 17. Support 20 may, however, be rigidly attached to vertical member 18. The upper beam 16 has two reduced sections 31 and 32. A strain gage 1 is attached to the upper surface of beam 16 adjacent to reduced section 31 and a strain gage 2 is attached to the upper surface of beam 16 over reduced section 32. While strain gages 1 and 2 are shown applied to the upper surface of beam 16 in accordance with the exemplary embodiment of the invention described herein, they may equally well be applied to the beam within the reduced sections 31 and 32, respectively, on the lower surface of beam 16. Likewise, lower beam 17 is provided with reduced sections 33 and 34. Strain gages 3 and 4 are applied on the outside surface of beam 17 adjacent to these reduced sections. However, as with upper beam 16 these strain gages may be applied within the reduced sections 33 and 34, respectively, of beam 17. Further, the present invention does not require that beams 16 and 17 be provided with the reduced sections 31, 32 and 33, 34. The beams may instead be of substantially uniform dimension without the reduced sections.

In the prior art, each strain gage 1, 2, 3 and 4 was positioned over the center line of the top surface of beam 16 or the bottom surface of beam 17. However, with that arrangement it is highly desirable, if not necessary, to position the load at the center of platform 22 (location c in FIGS. 2 and 5). If the load is placed at a different location the indicated weight is at least slightly inaccurate. In accordance with the prior art solution to this problem, the reduced sections 31-34 were filed or honed in an effort to reduce these inaccuracies. This solution is both costly and time consuming since it involves "cut and try" procedures where only a small amount of material can be removed at any time before testing. If too much material is removed, the load capacity of the structure is reduced so that the entire structure must be discarded.

The errors due to shifting of the load to different positions on the platform generally arise from slight variations of many factors. Some of the factors that may affect the accuracy of the weight measurements when the load is shifted (off center) on the plateform include: (1) small variations in the position of the strain gages on the beams, (2) variations in the bonding of the strain gages to the beams, (3) strain gage geometry variations, (4) strain gage resistance variations, (5) strain gage factor variations, (6) variations in the load cell geometry, (7) variations in the thickness of the reduced sections of the beams, (8) variations in the location of the reduced sections, (9) variation in the geometry of the reduced sections of the beams, (10) variations in composition of the load cell, (11) variation in strains in the load cell due to machining and other factors, and (12) variations in the lead wires and in the connecting circuitry.

In accordance with the present invention, the strain gages of either or both of the vertical pairs, 1, 4 and 2, 3 of strain gages are displaced off the center lines of beams 16 and 17 toward opposite sides of the vertical central plane 30 (FIGS. 2 and 3) through the load cell structure. Thus, as shown in FIG. 3, strain gage 2 of vertical pair 2, 3 is displaced or placed to the right of vertical plane 30 while strain gage 3 is displaced to the left of plane 30. Similarly, strain gage 1 is displaced to the right (FIG. 2) while strain gage 4 is displaced to the left with respect to vertical plane 30. While the strain gages are shown in the drawing placed completely on opposite sides of the central vertical plane 30, that is not essential. Instead, they may be displaced to a greater or lesser extent depending upon the various factors and dimensions of the load cell structure. Also, while the strain gages of both vertical pairs are shown displaced in the manner described above, it is not essential that the strain gages of both pairs be so displaced. The respective strain gages of only one pair may be displaced while the strain gages of the other pair are centrally located with respect to central vertical plane 30.

In accordance with the present invention, instead of attempting to hone or cut the load cell structure to correct or eliminate errors due to placement of loads at different positions on platform 22, compensating resistors are employed either in parallel or in series or both in series and in parallel with the strain gage resistances. However, since there is no known method of determining beforehand the value of such resistors or in accordance with the prior art the amount or position to which material should be removed from the load cell structure, it is necessary to test each of the load cell structures individually.

After the load cell has been constructed and assembled as described above, the strain gage resistors 1, 2, 3, 4 are connected in a bridge circuit as shown in FIG. 4 so that the physically adjacent pairs of gages 1,2; 2,3; 3,4; and 4,1 on the load cell structure are electrically adjacent in the bridge circuit. At this time, the compensating resistors 11, 12, 13 and 14 are not connected in parallel with the respective strain gage resistors. One set of terminals of the bridge is connected to power source 24 and the other terminals are connected to an indicating device 40 which indicates the output of the strain gage resistor bridge. The indicator device 40 may be calibrated in any desired units. For convenience, the units will be referred to herein as counts.

Figure 5:
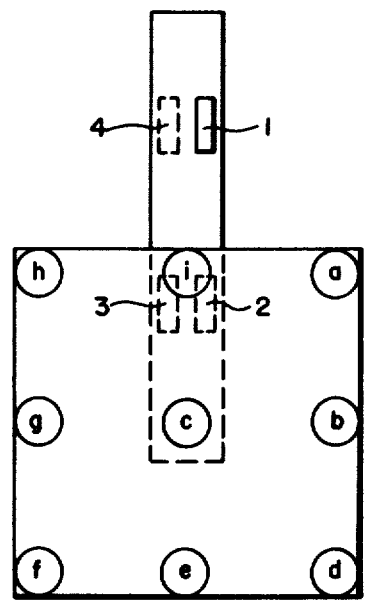
FIG. 5 is a plan view of the scale of FIGS. 1 to 3 showing exemplary test positions for loads on the platform.

After the bridge has been connected as described, a test weight is put on the platform 22 in different ones of the positions shown in FIG. 5 and the differences in count output from indicator 40 are recorded. For example, the test weight may be first placed in a central location c and then moved to position b and the difference in the outputs on device 40 is noted. The test weight is then moved to the longitudinal position e in FIG. 5 and again the change in output from indicator 40 due to moving the test weight from position c to position e is noted. The column headed "No R" in Table I below shows typical variations in the output indications for moving the test weight from position c to b and from position c to position e.

Next, test resistor networks are connected to the strain gages. The networks may include series resistors, parallel resistors or both series and parallel resistors. In the exemplary embodiment described herein a trial compensating resistor 11 is connected in parallel with strain gage 1 and a trial compensating resistor 12 connected in parallel with strain gage 2. The trail compensating resistors are of the same value so they do not unbalance the bridge circuit and are of some nominal value. On a typical load cell where the gage resistors have a value of approximately 350 ohms, a suitable value for the trial compensating resistors for the initial tests is approximately 4,000 ohms. With a 4,000 ohm resistor connected in parallel with the strain gage 1 and another in parallel with strain gage 2 the test weight is again put in the center of the platform at location c, moved to location b and then moved to location e. As before, the changes in the outputs from indicator 40 are determined and are shown in the $R_1R_2$ column of Table I below.

Next, resistor 11 is disconnected from strain gage 1 and resistor 13 is connected across strain gage 3. Resistor 13 is again of the same value as resistors 11 and 12 so that with resistors 12 and 13 now connected across strain gages 2 and 3 the bridge circuit is again not unbalanced. At this time the test weight is again applied at location c and then moved to locations b and e and the changes in the outputs of the load cell, as indicated on indicator 40, recorded as shown in column $R_2R_3$ of Table I. Next, compensating resistor 12 is disconnected from strain gage 2 and similar resistor 14 is connected across strain gage 4. The above test procedure is repeated, moving the weight from central location c to transverse location b and then to longitudinal location e. The differences in output from indicator 40 are shown in column $R_3R_4$ of Table I. Compensating resistor 13 is then disconnected from strain gage 3 and compensating resistor 11 reconnected across strain gage 1. The above test procedure is repeated and the differences recorded as in column $R_4R_1$ of Table I.

TABLE I

| Positions | No R | $R_1R_2$ | $R_2R_3$ | $R_3R_4$ | $R_4R_1$ |
|---|---|---|---|---|---|
| Pos b − Pos c | 54 | 34 | 48 | 65 | 52 |
| Pos e − Pos c | 2 | 4 | 11 | −2 | −8 |

If it is desired to compensate only for transverse displacement (e.g. toward position b in FIG. 5) of the load, columns No R and $R_1R_2$ of Table I show that a shunt resistor of 4,000 ohms across strain gages 1 and 2 reduces the error from 54 to 34 units. To further reduce this error, the approximate value of a compensating resistor required may be calculated as explained below.

The output of a single strain gage is often expressed as $\Delta G/G$ where G is the resistance of the strain gage. If a shunt resistor of S ohms is connected across the strain gage, the output is reduced to $A(\Delta G/G)$ where A is an attenuation constant having a value between 0 and 1 and is approximately equal to $A = S/(S+G)$. Now, the output of a strain gage bridge may be expressed as $\Delta E/V$ where $\Delta E$ is the change in output and V is the applied voltage. Thus, for a load at the center c (FIG. 5) of the scale platform:

$$\left.\frac{\Delta E}{V}\right)_c = \frac{1}{4}\left(\frac{\Delta G_1}{G_1} - \frac{\Delta G_2}{G_2} + \frac{\Delta G_3}{G_3} - \frac{\Delta G_4}{G_4}\right) \quad (1)$$

Now, if the load is shifted to position b on the platform the output of the bridge becomes $$\left.\frac{\Delta E}{V}\right)_b = \quad (2)$$

$$\frac{1}{4}\left(\frac{\Delta G_1 + r_1}{G_1} - \frac{\Delta G_2 + r_2}{G_2} + \frac{\Delta G_3 + r_3}{G_3} - \frac{\Delta G_4 + r_4}{G_4}\right)$$

where $r_1$, $r_2$, $r_3$ and $r_4$ represent the change in the output of the respective strain gages due to shifting of the load from c to b. Subtracting equation (1) from equation (2):

$$\left.\frac{\Delta E}{V}\right)_b - \left.\frac{\Delta E}{V}\right)_c = \quad (3)$$

$$\frac{1}{4}\left(\frac{r_1}{G_1} - \frac{r_2}{G_2} + \frac{r_3}{G_3} - \frac{r_4}{G_4}\right) = 54 \text{ for condition No } R \text{ in Table I.}$$

Now connecting a test shunt resistor S across strain gages 1 and 2 and with the load at c $$\left.\frac{\Delta E}{V}\right)_{cS} = \quad (4)$$

$$\frac{1}{4}\left(A_T\left(\frac{\Delta G_1}{G_1}\right) - A_T\left(\frac{\Delta G_2}{G_2}\right) + \frac{\Delta G_3}{G_3} - \frac{\Delta G_4}{G_4}\right)$$

where $A_T$ is the attenuation produced by the test shunt resistor. With the load now shifted to b $$\left.\frac{\Delta E}{V}\right)_{bS} = \frac{1}{4}\left(A_T\left(\frac{\Delta G_1 + r_1}{G_1}\right) - \quad (5)\right.$$

$$\left. A_T\left(\frac{\Delta G_2 + r_2}{G_2}\right) + \frac{\Delta G_3 + r_3}{G_3} - \frac{\Delta G_4 + r_4}{G_4}\right)$$

Now subtracting equation (4) from (5)

$$\left.\frac{\Delta E}{V}\right)_{bS} - \left.\frac{\Delta E}{V}\right)_{cS} = \quad (6)$$

$$\frac{1}{4}\left(A_T\frac{r_1}{G_1} - A_T\frac{r_2}{G_2} + r_3 - r_4\right) = 34 \text{ for condition } R_1R_2 \text{ in Table I.}$$

Subtracting equation (6) from (3)

$$\frac{1}{4}\left(\frac{r_1}{G_1} - A_T\frac{r_1}{G_1} - \frac{r_2}{G_2} + A_T\frac{r_2}{G_2}\right) = 54 - 34 = 20 \quad (7)$$

$$\frac{1}{4}\left((1 - A_T)\frac{r_1}{G_1} - (1 - A_T)\frac{r_2}{G_2}\right) =$$

$$\frac{1}{4}(1 - A_T)\left(\frac{r_1}{G_1} - \frac{r_2}{G_2}\right) = 20$$

Thus, a 4,000 ohm shunt resistor across gages 1 and 2 reduced the shifting error (position c to position b, FIG. 5) from 54 units to 34. To more fully correct for the shifting error and obtain a corresponding final attenuation $A_F$ and value of shunt resistor to produce the correction, it follows from (7)

$$\frac{1 - A_T}{1 - A_F} = \frac{54 - 34}{54 - 0} = \frac{20}{54} \text{ but } A_T = \frac{4000}{4000 + 350} = 0.9195 \quad (8)$$

so the final A should be $A_F = 0.783$ and from $A_F = S/(S+G)$ $S = 1260$ ohms.

Alternatively, the mid point between the test values in Table I for the test shunt across gages $R_1$ and $R_2$ (column $R_1R_2$) and the test shunt across gages $R_3$ and $R_4$ (column $R_3R_4$) may be used instead of the test value obtained with no shunt resistors connected to the bridge.

$$\frac{1 - A_T}{1 - A_F} = \frac{\frac{1}{2}(65 + 34) - 34}{\frac{1}{2}(65 + 34) - 0} = \frac{49.5 - 34}{49.5} = \frac{15.5}{49.5} \quad (8A)$$

and $A_F = 0.743$ and $S = 1012$ ohms. This method usually gives a better approximation of the desired value of the shunt resistor.

The examples above involved compensation for transverse shift only, that is, from point c toward point b (or point g) in FIG. 5. If it is desired to compensate for longitudinal shift only, that is, from point c to point e (or point i) in FIG. 5, either of the above procedures may be followed using the second row of Table I and the values obtained with the test shunt resistors across either strain gages $R_2$ and $R_3$ or $R_1$ and $R_4$ or across both pairs.

There is an interaction between the transverse and longitudinal shift compensations. If corrected independently, whenever one compensation is made it will change the amount of compensation required for shift of the other type. Thus, numerous corrections would have to be made in an iterative manner until the shift specifications are met. This approach is slow and costly.

As a further aspect of the present invention, equations are written representing the required corrections. The constants are determined by tests and then the desired amount of correction or compensation is determined.

For example, let $$Y = Ay + Bx + E$$

and $$X = Cy + Dx + F \quad (9)$$

where y is the change in indicated weight observed when the applied load is shifted in one direction, identified as the y direction, and is a function of the values of the test compensating resistors;

x is the change in indicated weight observed when the applied load is shifted in a direction substantially orthogonal to the y direction and identified as the x direction, and is a function of the values of the test compensating resistors;

Y is the change in load shift error resulting from the addition of compensating resistors to either opposite pair of adjacent strain gages, for example gages 2,3 or 4,1 in FIGS. 2 and 4;

X is the change in load shift error resulting from the addition of compensating resistors to either opposite pair of adjacent gages not used in determining Y, for example gages 1,2 or 3,4; and A, B, C, D, E, and F are constants.

As defined above, the values of X and Y are substantially independent of each other. The units of Y, X, y, and x are increments of weight or, more specifically as used in the examples, counts. Also, it should be noted that the x and y directions do not necessarily correspond to transverse and longitudinal directions on platform 22.

One way to determine the constants in equation (9) is to place a test weight on platform 22 in different positions with test compensating resistors connected to different pairs of strain gages and utilize the output indications from indicator 40. One procedure utilizes data from placing the test weight at positions b, e, g and i or at positions a, d, f and h, as shown in FIG. 5, with test compensating resistors connected to the various pairs of strain gages. Table II below shows one set of such data where the test compensating shunt resistor S is again 4000 ohms.

TABLE II

| Position | $R_1, R_2$ | $R_2, R_3$ | $R_3, R_4$ | $R_4, R_1$ |
|---|---|---|---|---|
| a | 52984 | 53811 | 54019 | 53387 |
| d | 52940 | 53816 | 53970 | 53287 |
| f | 52813 | 53870 | 54095 | 53242 |
| h | 52902 | 53901 | 54181 | 53376 |
| $a - f = x_n$ | 161 | −59 | −76 | 145 |
| $d - h = y_n$ | 38 | −85 | −211 | −89 |

In Table II, the differences between the readings at diagonally opposite corners (a,f and d,h in FIG. 5) of platform 22 are determined and recorded as x and y values with test compensating resistors in place across the respective sets of strain gages. Readings need not be taken without test compensating resistors in place so that there is not a "No R" column in Table II. The "No R" points are determined from Table II as will become apparent below.

Figure 6:
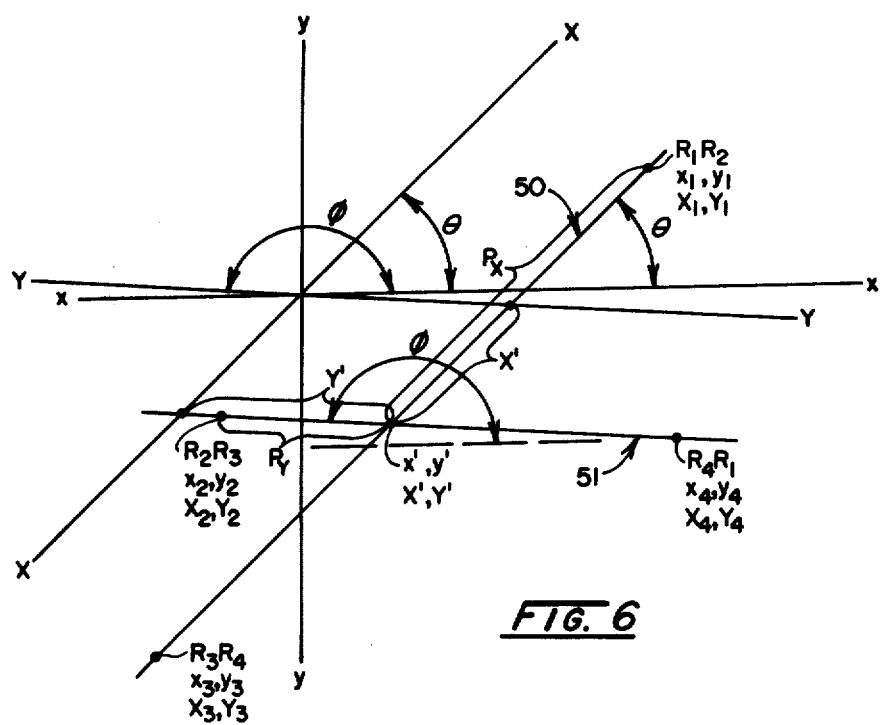
FIG. 6 is a graph illustrating the effects of the values of the resistor networks connected to the various strain gages.

If the data from Table II are plotted on an x-y axis as shown in FIG. 6, one line 50 can be drawn through the points for $R_1R_2$ and $R_3R_4$ and another line 51 intersecting the first through the points for $R_2R_3$ and $R_4R_1$. The lower the value of the test compensating shunt resistors S connected to the strain gages, the further the plotted points are from the intersection of the lines. The intersection is close to the uncompensated or "No R" point for load shift in either or both of the x and y directions. Changes in shift produced by placing shunt resistors across a pair of strain gages is represented by movement along the proper line. Increasing values of shunt resistors move the point along the line toward the intersection while decreasing values move it away from the intersection.

Since the origin of the x,y axis represents the point of zero load shift error and the point x',y' represents the load shift error without compensation, complete compensation for load shift can be obtained by placing the appropriate compensating resistance values across the appropriate strain gages such that the point x',y' is made to coincide with the origin of the x,y axis. In accordance with the present invention the proper values of compensating resistances to accomplish this may be determined mathematically using FIG. 6 and Table II. First, the x,y axes are rotated to define the X,Y axes parallel to the respective intersecting lines 50,51. The X and Y coordinates (X',Y') of the point x',y' can then be determined to obtain the appropriate values of compensating resistors required.

The relationship of the x,y axes to the X,Y axes is given by $$y = Y \sin \phi + X \sin \theta,$$

and $$x = Y \cos \phi + X \cos \theta \qquad (10)$$

where $\phi$ and $\theta$ are the angles shown in FIG. 6. Solving for Y and X yields $$Y = \frac{\cos \theta}{\sin (\phi - \theta)} y - \frac{\sin \theta}{\sin (\phi - \theta)} x \qquad (11)$$

$$X = -\frac{\cos \phi}{\sin (\phi - \theta)} y + \frac{\sin \phi}{\sin (\phi - \theta)} x$$

Solving for the coordinates X',Y' of the point x',y' in the X,Y coordinate system $$Y' = \frac{\cos \theta}{\sin (\phi - \theta)} y' - \frac{\sin \theta}{\sin (\phi - \theta)} x'$$

$$X' = -\frac{\cos \phi}{\sin (\phi - \theta)} y' + \frac{\sin \phi}{\sin (\phi - \theta)} x'$$

where y' and x' are, as previously defined, the intersection coordinates of the lines 50,51. $y' = -86.9823$ and $x' = 42.0409$. Now solving for Y' and X'

$$Y' = -122.5679; \quad X' = -116.7668$$

where, from FIG. 6 and Table II $$\sin \theta = \frac{38 - (-211)}{\sqrt{(38 + 211)^2 + (161 + 76)^2}} = 0.724345$$

$$\cos \theta = 0.689438$$

$$\sin \phi = \frac{-85 - (-89)}{\sqrt{(89 - 85)^2 + (-59 - 145)^2}} = 0.019604$$

$$\cos \phi = -0.999808$$

$$\sin (\phi - \theta) = \sin \phi \cos \theta - \cos \phi \sin \theta = 0.737722.$$

From this point the calculated values X' and Y' are utilized with the actual change caused by the test shunt resistors to determine the size of the needed final compensating resistors.

The next step is to find $A_{FY}$, the final attenuation term for changes in Y direction. From this the final trim resistors $S_{FY}$ can be calculated. As in equation (8), a ratio is formed $$\frac{1 - A_{TY}}{1 - A_{FY}} = \frac{P_Y}{Y'}$$

where $P_Y$ is the weight change between the weight represented by the point x',y' (or X',Y') and the weight represented by the coordinates of the test reading on line 51 in the direction of the needed correction. This weight change is represented in FIG. 6 by the distance along line 51 from x',y' to $x_2,y_2$. In this example, from Table II and FIG. 6

$$P_Y = \sqrt{(-59 - 42.0409)^2 + (-85 + 86.9823)^2} = 101.0603.$$

Also from equation (8), with a test resistance of 4000 ohms, $A_{TY}=0.9195$ and $1-A_{TY}=0.0805$. Then $$\frac{0.0805}{1 - A_{FY}} = \frac{101.0603}{122.5679}$$

$$A_{FY} = 0.9022 = \frac{S_{FY}}{S_{FY} + G}, \text{ and } G = 350 \text{ ohms}$$

$$S_{FY} = 3229 \text{ ohms}.$$

Similarly for $A_{FX}$ $$\frac{1 - A_{TX}}{1 - A_{FX}} = \frac{P_X}{X'}$$

$P_X$ is represented in FIG. 6 by the distance along line 50 from $x',y'$ to $x_1,y_1$.

$$P_X = \sqrt{(161 - 42.0409)^2 + (38 + 86.9823)^2} = 172.5452$$

$$1 - A_{TX} = 0.0805$$

$$\frac{0.0805}{1 - A_{FX}} = \frac{P_X}{X'} = \frac{172.5452}{116.7668}$$

$$A_{FX} = 0.9455$$

$$S_{FX} = 6072 \text{ ohms}.$$

Thus, a 6072 ohm resistor should be placed across gage 4, and a 3229 ohm resistor placed across gage 2. Combining $S_{FX}$ and $S_{FY}$ in $$\frac{S_{FX} \cdot S_{FY}}{S_{FX} + S_{FY}}$$

gives a resistor of 2108 ohms to be placed across gage 3.

Thus, the error due to shifting of the weight on the scale platform may be reduced to a very small value.

As mentioned above, the test and final resistor networks connected to the strain gages may include series resistors rather than shunt resistors as in the exemplary embodiment described. In that case the attenuation factor A for a series resistor connected to the strain gage must be used instead of that for a shunt resistor. The attenuation factor for the series resistor is $A = G/(G+T)$ where G is the resistance of the strain gage and T is the resistance of the series resistor. Except for using series resistors and the attenuation factor A for the series resistors, the procedure and calculations for compensating for load shifts are the same as those described above.

What is claimed is:

1. A force measuring load cell arrangement comprising in combination two substantially parallel beam means, means for rigidly connecting one end of the beam means together, support means connected to said ends of the beam means, means for rigidly connecting the other ends of the beam means together, a force receiver supported by said other ends of the beam means, strain gages mounted on each of the beam means, at least one strain gage being mounted laterally toward one side of one of the beam means and at least one strain gage being mounted laterally toward the other side of the other of the beam means, means for connecting the strain gages in a bridge arrangement, a shunt resistor connected across each of the strain gages mounted on one of the beam means to cause the output of the bridge arrangement to accurately represent the magnitude of a force applied to the force receiver independently of the lateral position of the force relative to the beam means.

2. A force measuring load cell arrangement comprising two elongated beams having substantially parallel longitudinal axes, means for rigidly connecting one end of the beams together, support means for rigidly connecting the other ends of the beams together and to a force receiver, means for mounting strain gages on the beams, at least one strain gage on one of the beams being displaced toward one side of the beam in a direction transverse to the longitudinal axes of the beams, at least one strain gage on the other beam being displaced toward the other side of said other beam in a direction transverse to the longitudinal axes of the beams, means for connecting the strain gages in a bridge arrangement, means for connecting a resistor to at least one of the strain gages on at least one of the beams to cause the output of the bridge arrangement to accurately represent the magnitude of a force applied to the force receiver independent of any offset of the force relative to the beams in at least the transverse direction.

3. An arrangement as claimed in claim 2 wherein resistors are connected to two strain gages on one of the beams to cause the output of the bridge arrangement to accurately represent the magnitude of a force applied to the force receiver independent of the transverse position of the force relative to the beams.

4. An arrangement as claimed in claim 2 wherein resistors are connected to two strain gages on one of the beams and at least one strain gage on the other of the beams to cause the output of the bridge arrangement to accurately represent the magnitude of a force applied to the force receiver independent of the position of the force relative to the beams.

5. A force measuring load cell arrangement in accordance with claim 2 characterized in that the resistors connected to the strain gages mounted on one of the beams have substantially the same resistance.

6. A force measuring load cell arrangement comprising two substantially parallel beam elements, one end of the beam elements being connected together and to a support, means for connecting the other ends of the beam elements together, force receiving means supported by said other ends of the beam elements, two strain gages mounted on each beam, at least one strain gage being mounted toward one edge of one beam and at least one strain gage being mounted toward the other edge of the other beam, means for interconnecting the strain gages in a bridge arrangement, resistors connected to three of the strain gages to cause the output of the bridge arrangement to accurately represent the magnitude of a force applied to the receiver independently of the position of the force relative to the beam elements.

7. A method of compensating a force measuring load cell arrangement including two beams having substantially parallel longitudinal axes and supporting a force receiving member, the method comprising the steps of (1) placing at least one strain gage toward one side of one of the beams in a direction transverse to the longitudinal axes of the beams, (2) placing at least one strain gage toward the opposite side of the other beam in a direction transverse to the longitudinal axes of the beams, and (3) connecting a compensating resistor to at least one strain gage mounted on at least one of the beams to cause the response of the load cell arrangement to be independent of the location in at least the transverse direction of the force applied to the force receiving member.

* * * * *